(12) United States Patent
Nishioka et al.

(10) Patent No.: US 12,320,563 B2
(45) Date of Patent: Jun. 3, 2025

(54) COOLING SYSTEM

(71) Applicant: TOYOTA JIDOSHA KABUSHIKI KAISHA, Toyota (JP)

(72) Inventors: Hideo Nishioka, Toyota (JP); Takayuki Hosokawa, Ikeda (JP); Tomoyuki Miura, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 18/229,480

(22) Filed: Aug. 2, 2023

(65) Prior Publication Data
US 2024/0133598 A1 Apr. 25, 2024
US 2024/0230182 A9 Jul. 11, 2024

(30) Foreign Application Priority Data

Oct. 19, 2022 (JP) .................. 2022-167503

(51) Int. Cl.
F25B 41/40 (2021.01)
F25B 41/20 (2021.01)
B60K 1/00 (2006.01)
B60K 11/02 (2006.01)

(52) U.S. Cl.
CPC ............. F25B 41/40 (2021.01); F25B 41/20 (2021.01); *B60K 2001/003* (2013.01); *B60K 11/02* (2013.01)

(58) Field of Classification Search
CPC ........ F25B 41/20; F25B 41/40; F25B 25/005; B60K 11/02; B60K 2001/003
See application file for complete search history.

(56) References Cited

U.S. PATENT DOCUMENTS

| 2006/0118067 A1* | 6/2006 | Hewkin | F01P 11/0238 |
| | | | 123/41.54 |
| 2010/0006577 A1* | 1/2010 | Koshino | F01P 11/029 |
| | | | 220/501 |
| 2020/0408134 A1* | 12/2020 | Asano | F01P 11/08 |
| 2021/0300147 A1 | 9/2021 | Sakamoto et al. | |
| 2022/0282926 A1 | 9/2022 | Nishioka et al. | |

FOREIGN PATENT DOCUMENTS

| JP | 2020-081970 A | 6/2020 |
| JP | 2021-160553 A | 10/2021 |
| JP | 2022-134587 A | 9/2022 |

* cited by examiner

*Primary Examiner* — Joseph F Trpisovsky
(74) *Attorney, Agent, or Firm* — Dinsmore & Shohl LLP

(57) ABSTRACT

A cooling system disclosed herein includes a first system flow passage, a second system flow passage, and a reserve tank. The reserve tank includes a first chamber, a second chamber, a third chamber and fourth chamber and an intermediate chamber. A first inflow port is opened into the first chamber, a first outflow port is opened into the second chamber, a second inflow port is opened into the third chamber, and a second outflow port is opened into the fourth chamber. The first chamber and the second chamber communicate, the third chamber and the fourth chamber communicate, and the first chamber communicates with the third chamber through the intermediate chamber. The first system flow passage is connected to the first inflow port and the first outflow port, and the second system flow passage is connected to the second inflow port and the second outflow port.

2 Claims, 6 Drawing Sheets

COOLING SYSTEM

CROSS-REFERENCE TO RELATED APPLICATION

This application claims priority to Japanese Patent Application No. 2022-167503 filed on Oct. 19, 2022, incorporated herein by reference in its entirety.

BACKGROUND

1. Technical Field

A technique disclosed in the present specification relates to a cooling system including a first system flow passage that cools a first heat generating body and a second system flow passage that cools a second heat generating body.

2. Description of Related Art

A cooling device using liquid coolant includes a reserve tank. In the reserve tank disclosed in Japanese Unexamined Patent Application Publication No. 2020-081970 (JP 2020-081970 A), the coolant flows in from the exterior. The coolant stays in the reserve tank, and thereafter flows to the exterior of the reserve tank. While the coolant stays in the reserve tank, air bubbles are removed from the coolant.

Cooling systems disclosed in Japanese Unexamined Patent Application Publication No. 2022-134587 (JP 2022-134587 A) and Japanese Unexamined Patent Application Publication No. 2021-160553 (JP 2021-160553 A) include coolant flow passages for two systems, and the coolant flow passages for the two systems share one reserve tank. JP 2022-134587 A proposes a reserve tank in which the movement of heat quantity between the first system and the second system is restrained.

SUMMARY

In a cooling system that includes coolant flow passages for two systems and a reserve tank shared by the coolant flow passages for the two systems, the present specification provides a technique of further restraining the movement of heat quantity between the first system flow passage and the second system flow passage, compared to the technique in JP 2022-134587 A.

A cooling system disclosed in the present specification includes a first system flow passage, a second system flow passage, and a reserve tank. The first system flow passage cools a first heat generating body. The second system flow passage cools a second heat generating body that has a lower temperature than the first heat generating body.

The reserve tank includes a first chamber, a second chamber, a third chamber and a fourth chamber that face an outer wall of the reserve tank. The second chamber is disposed at the same height as the first chamber or at a lower position than the first chamber. The third chamber and the fourth chamber are disposed at lower positions than the first chamber. The reserve tank further includes at least one intermediate chamber, and a first inflow port, a first outflow port, a second inflow port and a second outflow port that are provided on the outer wall of the reserve tank. The first inflow port is opened into the first chamber, and the first outflow port is opened into the second chamber. The second inflow port is opened into the third chamber, and the second outflow port is opened into the fourth chamber. The first chamber and the second chamber communicate with each other, and the third chamber and the fourth chamber communicate with each other. The first chamber communicates with the third chamber through the intermediate chamber.

The first system flow passage is connected to the first inflow port and the first outflow port, and the second system flow passage is connected to the second inflow port and the second outflow port. The coolant that flows through the first system flow passage cools the first heat generating body having a higher temperature, and therefore has a higher temperature than the coolant that flows through the second system flow passage. The coolant having a higher temperature flows into the first chamber, and the coolant having a lower temperature flows into the third chamber. The first chamber is at a higher position than the third chamber, and the first chamber and the third chamber communicate with each other through at least one intermediate chamber. Therefore, it is hard for the coolant (the coolant having a higher temperature) in the first chamber to move to the third chamber, and it is hard for the coolant (the coolant having a lower temperature) in the third chamber to move to the first chamber. That is, the movement of heat quantity between the first system and the second system is restrained.

The first system flow passage may include a first upstream flow passage that is connected to the first outflow port, and a first downstream flow passage that is connected to the first inflow port. The second system flow passage may include a second upstream flow passage that is connected to the second outflow port, and a second downstream flow passage that is connected to the second inflow port. The cooling system may further include a first pump that causes coolant to flow from the reserve tank to the first upstream flow passage, a second pump that causes coolant to flow from the reserve tank to the second upstream flow passage, and a switching valve. The switching valve can switch between a first state and a second state. The first state is a state where the first upstream flow passage is connected to the first downstream flow passage and where the second upstream flow passage is connected to the second downstream flow passage. The second state is a state where the first upstream flow passage is connected to the second downstream flow passage and where the first downstream flow passage and the second upstream flow passage are closed. In the first state, the movement of heat quantity between the first system flow passage and the second system flow passage is slight, and in the second state, the first system flow passage and the second system flow passage are united and can be used as a third system flow passage.

Details and further improvements of the technique disclosed in the present specification will be described in "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
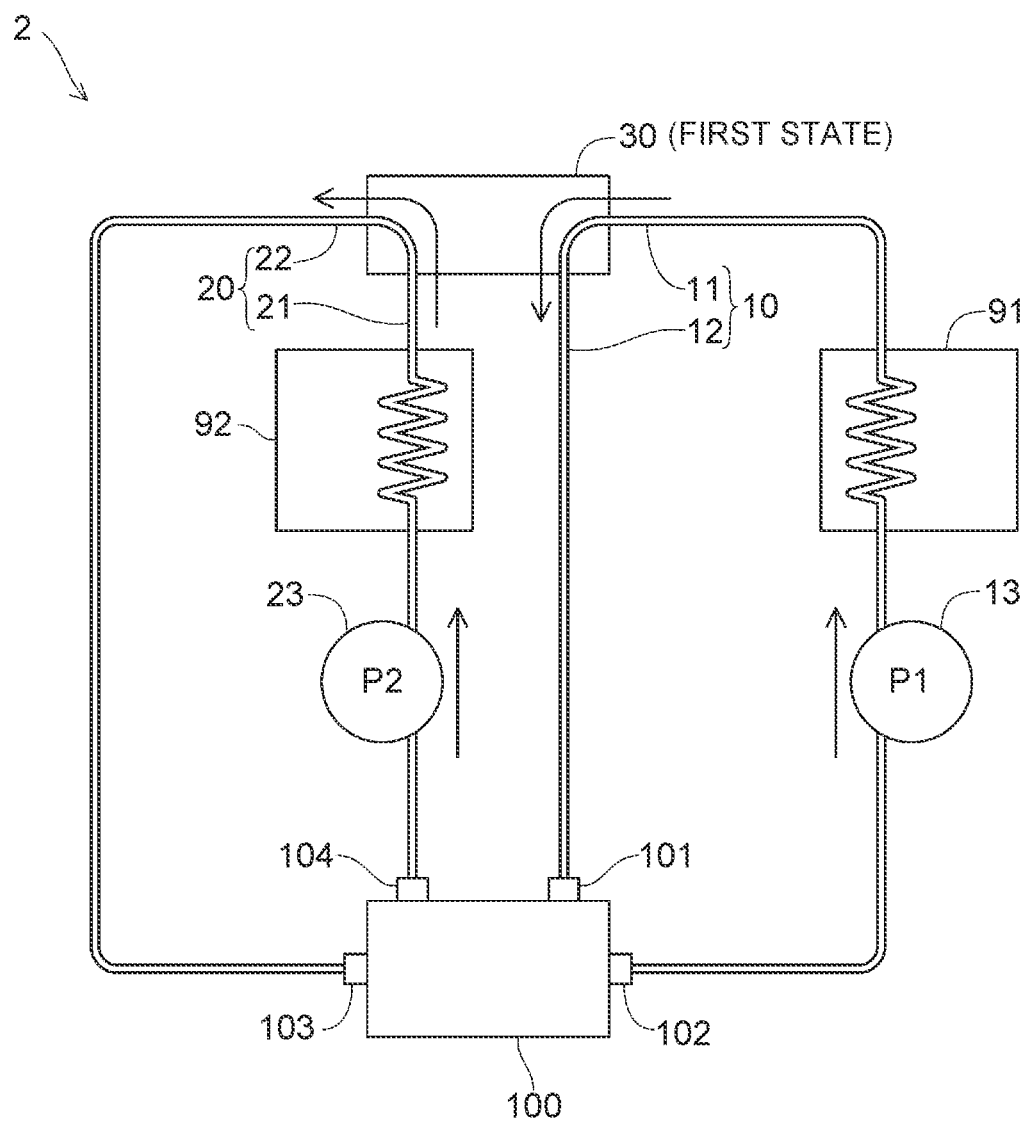
FIG. 1 is a block diagram of a cooling system in an embodiment (first state)

A cooling system 2 in an embodiment will be described with reference to the drawings. FIG. 1 shows a block diagram of the cooling system 2. The cooling system 2 includes a first system flow passage 10, a second system flow passage 20, a switching valve 30, and a reserve tank 100. The first system flow passage 10 passes through a first heat generating body 91. The first heat generating body 91 is cooled by coolant that flows through the first system flow passage 10. The second system flow passage 20 passes through a second heat generating body 92. The second heat generating body 92 is cooled by coolant that flows through the second system flow passage 20. The coolant is a liquid, and is typically water.

The cooling system 2 is mounted on a battery electric vehicle, and the first heat generating body 91 includes a motor for traveling and an electric power converter to produce alternating-current power by which the motor is driven. The second heat generating body 92 is a battery. The heat generation quantity of the first heat generating body 91 is larger than the heat generation quantity of the second heat generating body 92. Therefore, the temperature of the coolant that has passed through the first system flow passage 10 is higher than the temperature of the coolant that has passed through the second system flow passage 20.

The first system flow passage 10 includes a first upstream flow passage 11 and a first downstream flow passage 12. One end (upstream end) of the first upstream flow passage 11 is connected to a first outflow port 102 of the reserve tank 100, and the other end (downstream end) is connected to the switching valve 30. One end (upstream end) of the first downstream flow passage 12 is connected to the switching valve 30, and the other end (downstream end) is connected to the first inflow port 101 of the reserve tank 100. The first system flow passage 10 includes a first pump 13. The first pump 13 sucks up the coolant from the reserve tank 100, and causes the coolant to flow to the first upstream flow passage 11. The sucked coolant passes through the first heat generating body 91, the switching valve 30, and the first downstream flow passage 12, and returns to the reserve tank 100.

The second system flow passage 20 includes a second upstream flow passage 21 and a second downstream flow passage 22. One end (upstream end) of the second upstream flow passage 21 is connected to a second outflow port 104 of the reserve tank 100, and the other end (downstream end) is connected to the switching valve 30. One end (upstream end) of the second downstream flow passage 22 is connected to the switching valve 30, and the other end (downstream end) is connected to a second inflow port 103 of the reserve tank 100. The second system flow passage 20 includes a second pump 23. The second pump 23 sucks up the coolant from the reserve tank 100, and causes the coolant to flow to the second upstream flow passage 21. The sucked coolant passes through the second heat generating body 92, the switching valve 30, and the second downstream flow passage 22, and returns to the reserve tank 100.

The first system flow passage 10 and the second system flow passage 20 include devices such as radiators, but the illustration and description of the devices are omitted.

The switching valve 30 can switch between a first state and a second state. FIG. 1 shows the first state. In the first state, the switching valve 30 connects the first upstream flow passage 11 to the first downstream flow passage 12, and connects the second upstream flow passage 21 to the second downstream flow passage 22. In the first state, the first system flow passage 10 and the second system flow passage 20 each serve as independent cooling circuits, although the first system flow passage 10 and the second system flow passage 20 share the reserve tank 100.

Figure 2:
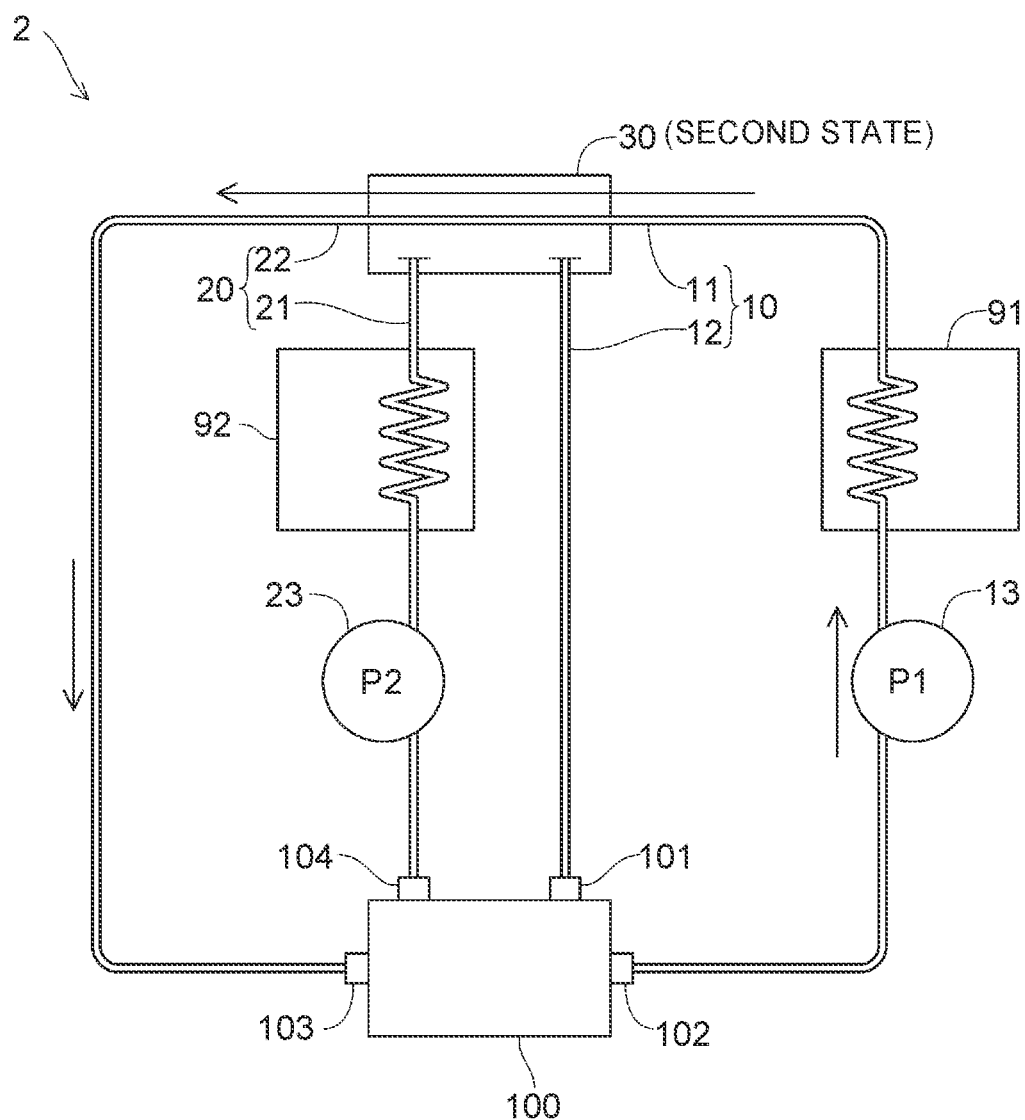
FIG. 2 is a block diagram of the cooling system in the embodiment (second state)

FIG. 2 shows a flow passage when the switching valve 30 is in the second state. In the second state, the switching valve 30 connects the first upstream flow passage 11 to the second downstream flow passage 22, and closes the first downstream flow passage 12 and the second upstream flow passage 21. When the first pump 13 is driven while the switching valve 30 is in the second state, the coolant passes through the reserve tank 100, the first upstream flow passage 11, the switching valve 30, and the second downstream flow passage 22, and returns to the reserve tank 100. In the second state, the first system flow passage 10 and the second system flow passage 20 merge to become a third system flow passage. The third system flow passage is used under a particular condition.

Figure 3:
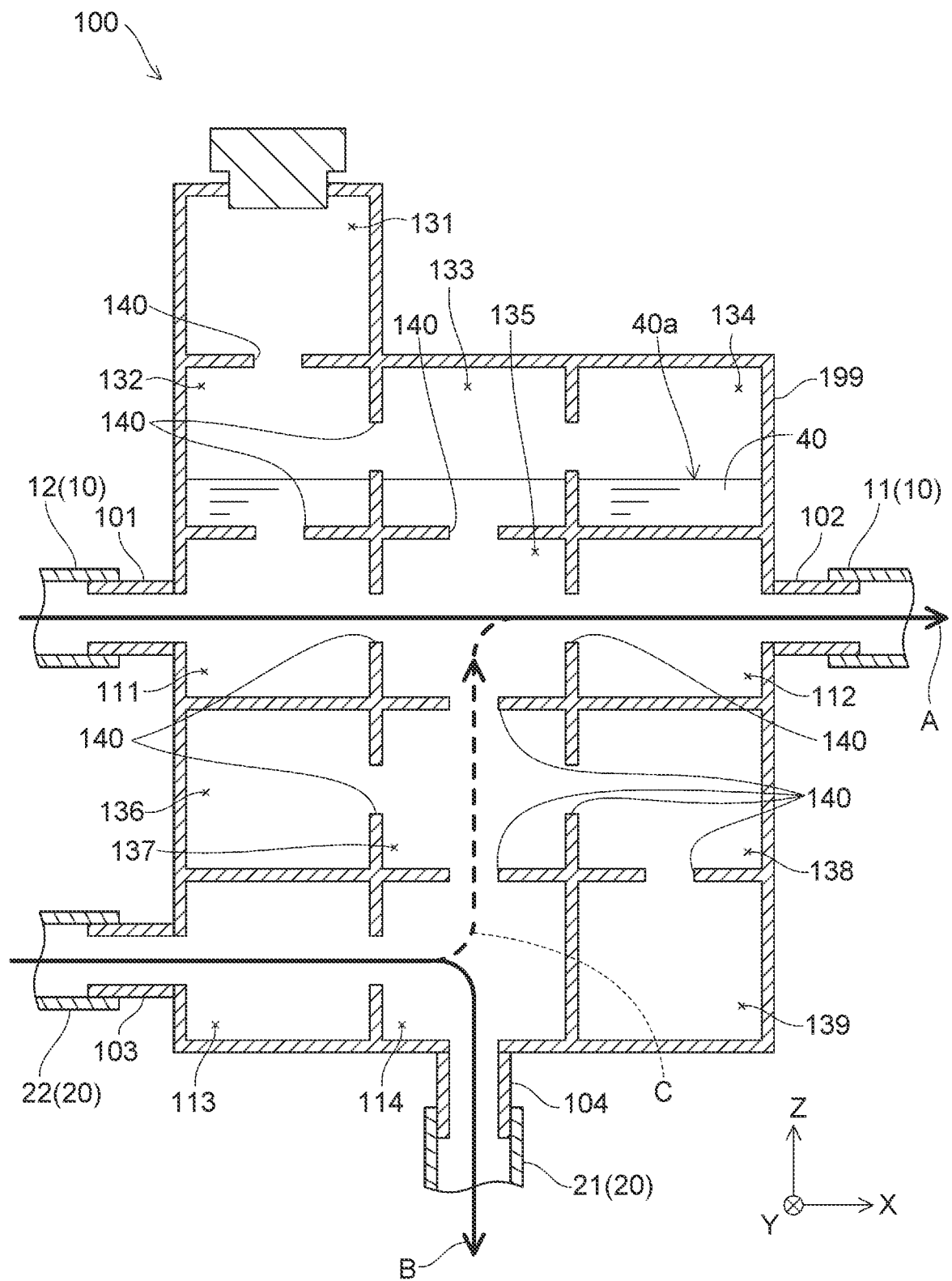
FIG. 3 is a sectional view of a reserve tank of the cooling system in the embodiment.

FIG. 3 shows a sectional view of the reserve tank 100. In the coordinate system in FIG. 3, the +Z direction corresponds to the upward vertical direction.

The internal space of the reserve tank 100 is divided into a first chamber 111, a second chamber 112, a third chamber 113 and a fourth chamber 114 that face (contact with) an outer wall 199, and a plurality of intermediate chambers 131 to 139. Adjacent chambers are partitioned by a partition wall. Some partition walls are provided with communication holes 140. The second chamber 112 is disposed at the same height as the first chamber 111. The third chamber 113 and the fourth chamber 114 are disposed at lower positions than the first chamber 111.

A liquid level 40a of coolant 40 is positioned in the intermediate chambers 132, 133, 134. There is an air space above the liquid level 40a, and air bubbles contained in the coolant 40 move to the air space and are separated from the coolant 40. That is, the reserve tank 100 plays a role in separating the air bubbles contained in the coolant 40, from the coolant 40.

The first inflow port 101, the first outflow port 102, the second inflow port 103, and the second outflow port 104 are provided on the outer wall 199. The first inflow port 101 is opened into the first chamber 111. The first outflow port 102 is opened into the second chamber 112. The second inflow port 103 is opened into the third chamber 113. The second outflow port 104 is opened into the fourth chamber 114. Further, as described above, the first downstream flow passage 12 is connected to the first inflow port 101, and the first upstream flow passage 11 is connected to the first outflow port 102. The second downstream flow passage 22 is connected to the second inflow port 103, and the second upstream flow passage 21 is connected to the second outflow port 104.

Further, the first chamber 111 communicates with the intermediate chamber 135 adjacent to the first chamber 111, and the intermediate chamber 135 communicates with the second chamber 112 adjacent to the intermediate chamber 135. In other words, the communication is provided from the first inflow port 101 to the first outflow port 102 in the horizontal direction. As described above, when the switching valve 30 is in the first state, the coolant moved out from the first outflow port 102 of the reserve tank 100 passes through the first system flow passage 10, and returns to the reserve tank 100 through the first inflow port 101. A thick arrow line A in FIG. 3 shows the flow of the coolant from the first inflow port 101 to the first outflow port 102. The thick arrow line A shows the flow of the coolant that flows through the first system flow passage 10 in the reserve tank 100.

The third chamber 113 communicates with the fourth chamber 114 adjacent to the third chamber 113. When the switching valve 30 is in the first state, the coolant moved out from the second outflow port 104 of the reserve tank 100 passes through the second system flow passage 20, and returns to the reserve tank 100 through the second inflow port 103. A thick arrow line B in FIG. 3 shows the flow of the coolant from the second inflow port 103 to the second outflow port 104. The thick arrow line B shows the flow of the coolant that flows through the second system flow passage 20 in the reserve tank 100.

The first chamber 111 and the third chamber 113 do not directly communicate with each other, and communicate with each other through the intermediate chambers 135, 137 and the fourth chamber 114. Moreover, the first chamber 111 and the second chamber 112 are at higher positions than the third chamber 113 and the fourth chamber 114. In other words, the first inflow port 101 and the first outflow port 102 are at higher positions than the second inflow port 103 and the second outflow port 104.

As described above, the heat quantity of the first heat generating body 91 that is cooled by the coolant passing through the first system flow passage 10 is larger than the heat quantity of the second heat generating body 92 that is cooled by the coolant passing through the second system flow passage 20. Therefore, the temperature of the coolant that has passed through the first system flow passage 10 and has returned to the first chamber 111 is higher than the temperature of the coolant that has passed through the second system flow passage 20 and has returned to the third chamber 113. The specific weight of the coolant having a higher temperature is lower than the specific weight of the coolant having a lower temperature. Therefore, it is hard for the coolant (the coolant having a higher temperature) in the first chamber 111 disposed at a higher position to flow to the third chamber 113 disposed at a lower position, and it is hard for the coolant (the coolant having a lower temperature) in the third chamber 113 to flow to the first chamber 111. The movement of heat quantity between the first system and the second system is restrained.

Since the first chamber 111 and the third chamber 113 do not directly communicate with each other and communicate with each other through the intermediate chambers 135, 137, the movement of heat quantity between the first system and the second system is further restrained.

Furthermore, the shortest flow passage (that is, the thick arrow line A) from the first inflow port 101 to the first outflow port 102 passes through a lower position than the shortest flow passage (that is, the thick arrow line B) from the second inflow port 103 to the second outflow port 104. This point also contributes to the reduction in the heat quantity that moves between the first system and the second system.

When the switching valve 30 is in the second state, the coolant in the reserve tank 100 passes through the first outflow port 102, the first upstream flow passage 11, the second downstream flow passage 22, and the second inflow port 103, and returns to the reserve tank 100. A broken arrow line C in FIG. 3 shows the flow of the coolant in the reserve tank 100 when the switching valve 30 is in the second state.

Modification

Figure 4:
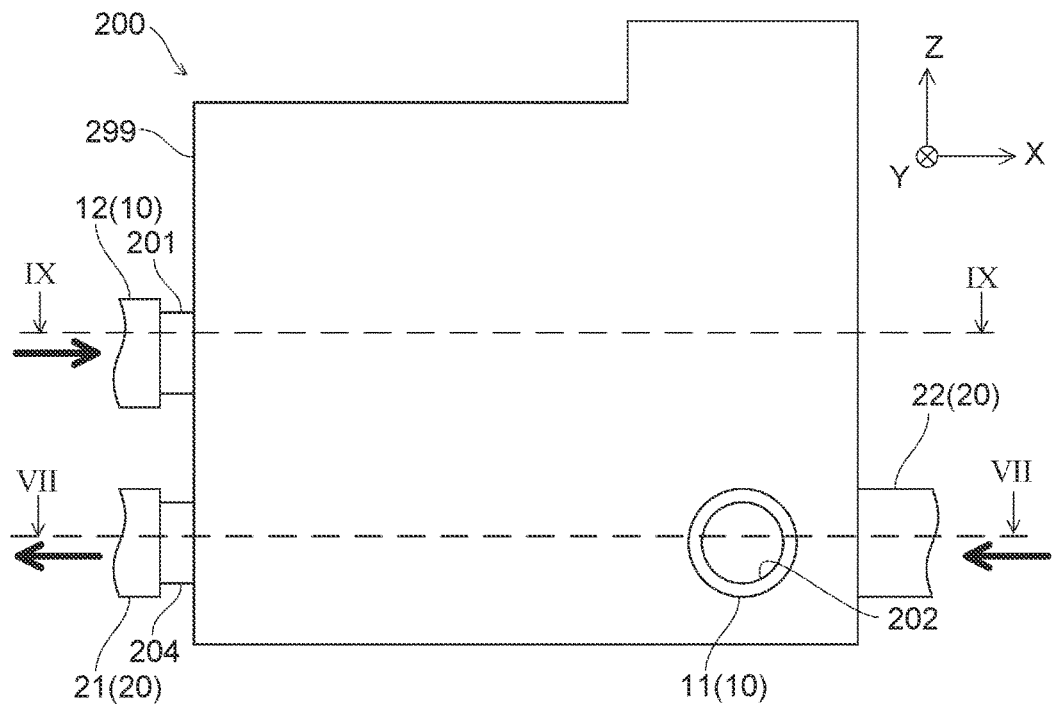
FIG. 4 is a side view of a reserve tank in a modification.
Figure 5:
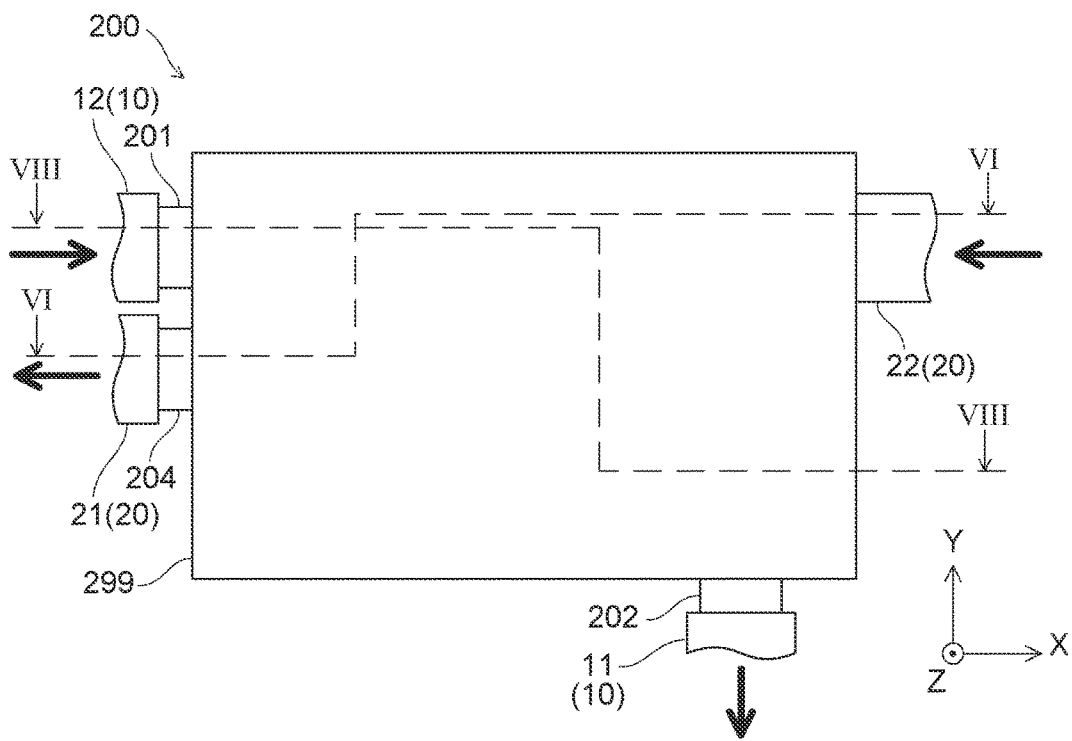
FIG. 5 is a top view of the reserve tank in the modification.

The configuration of a reserve tank 200 in a modification will be described with reference to FIG. 4 to FIG. 9. FIG. 4 is a side view of the reserve tank 200, and FIG. 5 is a plan view of the reserve tank 200. In FIG. 4 to FIG. 9 also, the +Z direction corresponds to the upward vertical direction.

A first inflow port 201, a first outflow port 202, a second inflow port 203, and a second outflow port 204 are provided on an outer wall 299 of a reserve tank 200. Although the second inflow port 203 does not appear in FIG. 4 and FIG. 5, the second inflow port 203 is disposed at the same height as the second outflow port 204. The first outflow port 202, the second inflow port 203, and the second outflow port 204 are disposed at lower positions than the first inflow port 201.

Figure 6:
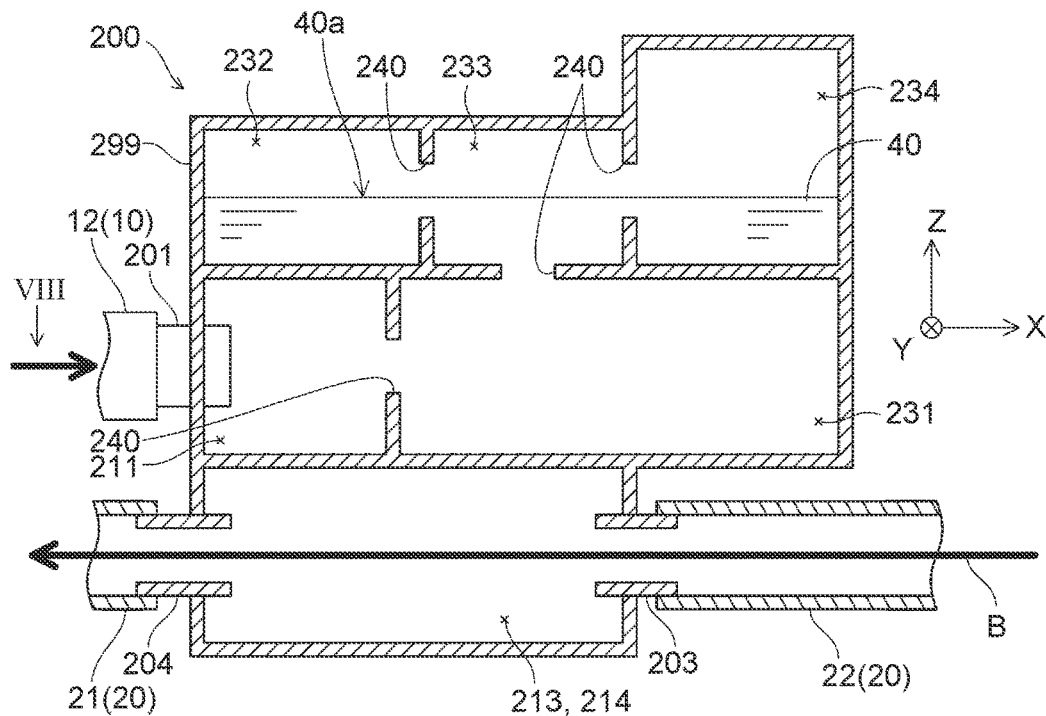
FIG. 6 is a sectional view of the reserve tank taken along line VI-VI in FIG. 5.
Figure 7:
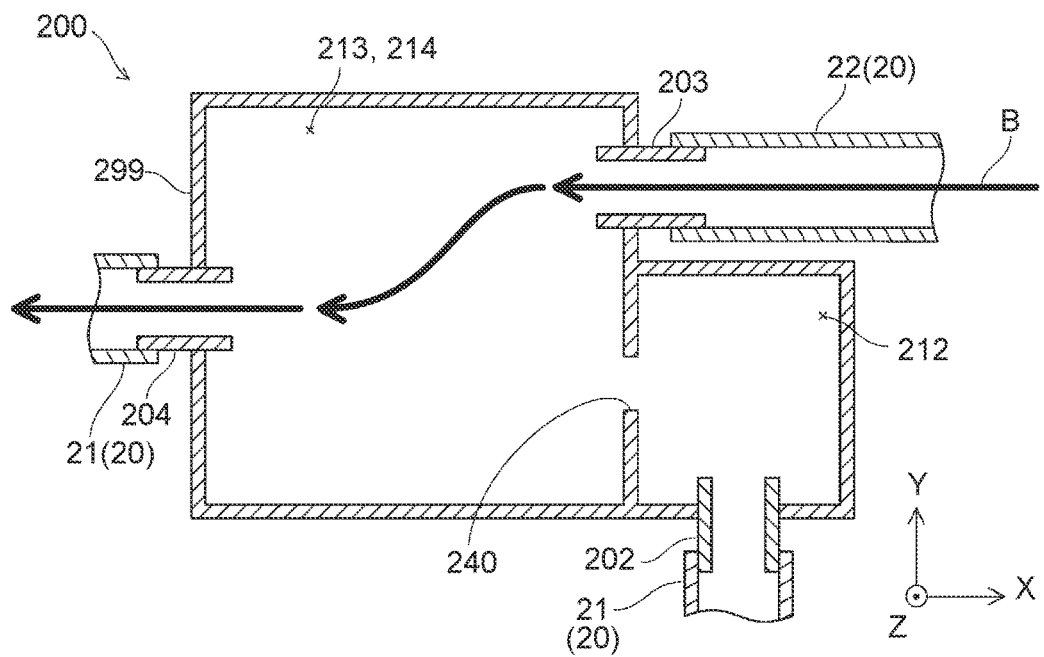
FIG. 7 is a sectional view of the reserve tank taken along line VII-VII in FIG. 4.

FIG. 6 shows a sectional view of the reserve tank 200 taken along line VI-VI in FIG. 5, and FIG. 7 shows a sectional view of the reserve tank 200 taken along line VII-VII in FIG. 4. As shown in FIG. 6, the inside of the reserve tank 200 has a three-layer structure. A second chamber 212, a third chamber 213, a fourth chamber 214 are disposed at the lowest layer. The third chamber 213 serves as the fourth chamber 214 also.

Intermediate chambers 232, 233, 234 are disposed at the highest layer, and a first chamber 211 and an intermediate chamber 231 are disposed at the intermediate layer. The first inflow port 201 is opened into the first chamber 211, and the first outflow port 202 is opened into the second chamber 212. The second inflow port 203 is opened into the third chamber 213, and the second outflow port 204 is opened into the fourth chamber 214.

Only the first inflow port 201 of the first inflow port 201, the first outflow port 202, the second inflow port 203, and the second outflow port 204 is disposed at a higher position than the other ports (the first outflow port 202, the second inflow port 203, and the second outflow port 204). The first outflow port 202, the second inflow port 203, and the second outflow port 204 are disposed at the same height (the lowest layer).

The liquid level 40a of the coolant 40 is positioned in the highest layer, that is, in the intermediate chambers 232, 233, 234. Air bubbles in the coolant 40 are released to the intermediate chambers 232, 233, 234.

The second downstream flow passage 22 of the second system flow passage is connected to the second inflow port 203, and the second upstream flow passage 21 is connected to the second outflow port 204. When the second pump 23 (see FIG. 1) is driven, the coolant is sucked up from the reserve tank 200 to the second upstream flow passage 21. The coolant passes through the switching valve 30 and the second downstream flow passage 22 from the second upstream flow passage 21, and returns to the reserve tank 200. The coolant moved into the second inflow port 203 passes through the third chamber 213 (that is, the fourth chamber 214), and moves out from the second outflow port 204. A thick arrow line B in FIG. 6 and FIG. 7 shows the flow of the coolant from the second inflow port 203 to the second outflow port 204. The thick arrow line B shows the flow of the coolant that flows through the second system flow passage 20 in the reserve tank 200. The coolant in the second system flow passage 20 flows through the lowermost layer in the reserve tank 200.

Figure 8:
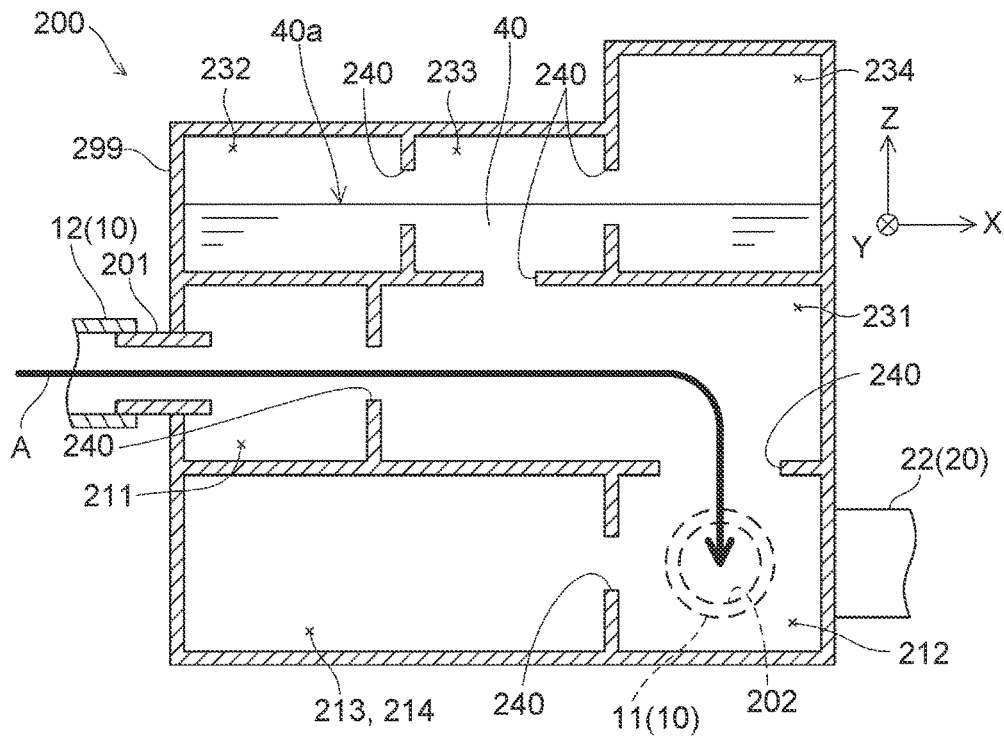
FIG. 8 is a sectional view of the reserve tank taken along line VIII-VIII in FIG. 5.
Figure 9:
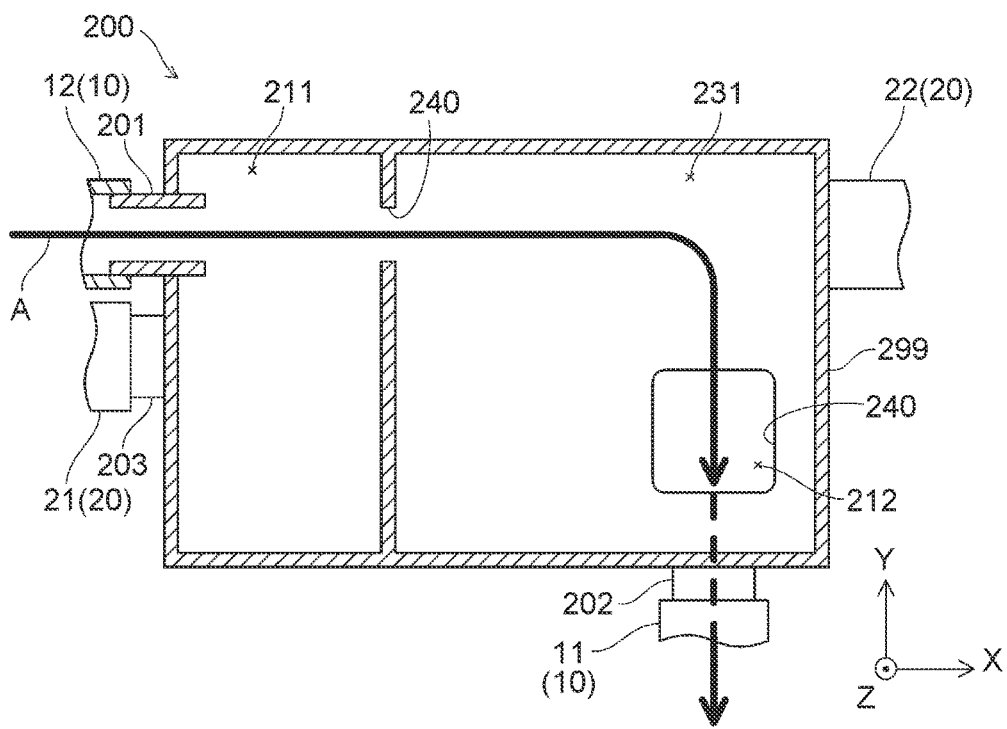
FIG. 9 is a sectional view of the reserve tank taken along line IX-IX in FIG. 4.

FIG. 8 shows a sectional view of the reserve tank 200 taken along line VIII-VIII in FIG. 5, and FIG. 9 shows a sectional view of the reserve tank 200 taken along line IX-IX in FIG. 4. The first inflow port 201 is opened into the first chamber 211, and the first chamber 211 adjoins the intermediate chamber 231. A communication hole 240 is provided on a partition wall between the first chamber 211 and the intermediate chamber 231, and the first chamber 211 and the intermediate chamber 231 communicates with each other. The second chamber 212 is positioned under the intermediate chamber 231, and a communication hole 240 is provided on a partition wall between the intermediate chamber 231 and the second chamber 212. The first chamber 211 communicates with the second chamber 212 through the intermediate chamber 231. The first outflow port 202 is opened into the second chamber 212.

When the first pump 13 (see FIG. 1) is driven, the coolant is sucked up from the reserve tank 200 to the first upstream flow passage 11. The coolant passes through the switching valve 30 and the first downstream flow passage 12 from the first upstream flow passage 11, and returns to the reserve tank 200. The coolant moved into the first inflow port 201 passes through the first chamber 211, the intermediate chamber 231, and the second chamber 212, and moves out from the first outflow port 202. A thick arrow line A in FIG. 8 and FIG. 9 shows the flow of the coolant from the first inflow port 201 to the first outflow port 202. The thick arrow line A shows the flow of the coolant that flows through the first system flow passage 10 in the reserve tank 200. The coolant in the first system flow passage moves from the intermediate layer to the lowermost layer in the reserve tank 200.

The first chamber 211 is positioned above the third chamber 213, and no communication hole is provided on a partition wall that partitions the first chamber 211 and the third chamber 213. A communication hole 240 is provided on a partition wall between the second chamber 212 and the third chamber 213. The first chamber 211 and the third chamber 213 communicate with the intermediate chamber 231 through the second chamber 212. The reserve tank 200 in the modification can restrain the movement of heat quantity between the first system and the second system, similarly to the reserve tank 100.

Note points about the technique described in the embodiment will be described. The second chamber only needs to be disposed at the same height as the first chamber or at a lower position than the first chamber. The third chamber and the fourth chamber are disposed at lower positions than the first chamber. The first chamber and the second chamber communicate with each other. The first chamber and the second chamber may be adjacent to each other, or may communicate with each other through at least one intermediate chamber. The third chamber and the fourth chamber may communicate with each other. The third chamber and the fourth chamber may be adjacent to each other, or may communicate with each other through at least one intermediate chamber. The first chamber and the second chamber need to communicate with each other through at least one intermediate chamber.

Specific examples of the present disclosure have been described above in detail. These are just examples, and do not limit the scope of the claims. The technique described in the claims includes various modifications and alterations of the above-described specific examples. Technical elements described in the present specification or the drawings exert technical utility independently or by various combinations, and are not limited to the combinations described in the claims at the time of filing. Further, the technique exemplified in the present specification or the drawings can achieve a plurality of purposes concurrently, and has technique utility simply by achieving one of the plurality of purposes.

What is claimed is:

1. A cooling system comprising:
    a first system flow passage that cools a first heat generating body; and
    a second system flow passage that cools a second heat generating body, the second heat generating body having a lower temperature than the first heat generating body; and
    a reserve tank, wherein:
    the reserve tank includes
    a first chamber that faces an outer wall of the reserve tank,
    a second chamber that faces the outer wall and that is disposed at the same height as the first chamber or at a lower position than the first chamber,
    a third chamber that faces the outer wall and that is disposed at a lower position than the first chamber,
    a fourth chamber that faces the outer wall and that is disposed at a lower position than the first chamber,
    at least one intermediate chamber,
    a first inflow port that is provided on the outer wall and that is opened into the first chamber,
    a first outflow port that is provided on the outer wall and that is opened into the second chamber,
    a second inflow port that is provided on the outer wall and that is opened into the third chamber, and
    a second outflow port that is provided on the outer wall and that is opened into the fourth chamber;
    the first chamber and the second chamber communicate with each other;
    the third chamber and the fourth chamber communicate with each other;
    the first chamber communicates with the third chamber through the intermediate chamber;
    the first system flow passage is connected to the first inflow port and the first outflow port; and
    the second system flow passage is connected to the second inflow port and the second outflow port.

2. The cooling system according to claim 1, wherein:
    the first system flow passage includes
        a first upstream flow passage that is connected to the first outflow port, and
        a first downstream flow passage that is connected to the first inflow port;
    the second system flow passage includes
        a second upstream flow passage that is connected to the second outflow port, and
        a second upstream flow passage that is connected to the second inflow port; and
    the cooling system further comprises
        a first pump that causes coolant to flow from the reserve tank to the first upstream flow passage,
        a second pump that causes coolant to flow from the reserve tank to the second upstream flow passage, and
        a switching valve that switches between a first state and a second state, the first state being a state where the first upstream flow passage is connected to the first downstream flow passage and where the second upstream flow passage is connected to the second upstream flow passage, the second state being a state where the first upstream flow passage is connected to the second upstream flow passage and where the first downstream flow passage and the second upstream flow passage are closed.

* * * * *